United States Patent
Shimizu et al.

(10) Patent No.: US 6,322,186 B1
(45) Date of Patent: Nov. 27, 2001

(54) IMAGE PROCESSING METHOD AND APPARATUS, AND PRINTING METHOD AND APPARATUS

(75) Inventors: Satoshi Shimizu; Kazumasa Matsumoto, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/265,588

(22) Filed: Mar. 10, 1999

(30) Foreign Application Priority Data

Mar. 11, 1998 (JP) .................................. 10-059794
Mar. 5, 1999 (JP) .................................. 11-058875

(51) Int. Cl.⁷ ............................ B41J 2/205; B41J 29/293
(52) U.S. Cl. ................................. 347/15; 347/19
(58) Field of Search .................... 347/14, 15, 19, 347/43

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/56 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 5,552,810 | * 9/1996 | Matsuo | 347/19 |
| 5,617,123 | 4/1997 | Takaoka et al. | 347/15 |
| 5,984,449 | * 11/1999 | Tajika et al. | 347/15 |

FOREIGN PATENT DOCUMENTS

| | | | |
|---|---|---|---|
| 0 454 479 | 10/1991 | (EP) | H04N/1/46 |
| 0 606 022 | 7/1994 | (EP) | H04N/1/032 |
| 0 685 962 | 12/1995 | (EP) | H04N/1/60 |
| 0 706 889 | 4/1996 | (EP) | B41J/2/205 |
| 0 750 995 | 1/1997 | (EP) | B41J/2/205 |
| 59-123670 | 7/1984 | (JP) | B41J/3/04 |
| 59-138461 | 8/1984 | (JP) | B41J/3/04 |

* cited by examiner

Primary Examiner—John Barlow
Assistant Examiner—Juanita Stephens
(74) Attorney, Agent, or Firm—Fitzpatrick, Cella, Harper & Scinto

(57) ABSTRACT

A printing apparatus comprises a plurality of ink-jet head units for different densities of ink. Plural types of superimposition print data for superimposing different densities of ink in accordance with density are stored in an ink type distribution table. A predetermined image is printed on a print medium by using the plural types of superimposition print data, and the density of the printed image is measured. Based on the measured density and a pixel value of original image data, the most optimum print data is selected from the plural types of superimposition print data stored in the ink type distribution table. By using the selected print data, driving data for printing the image is generated, using different densities of ink.

22 Claims, 11 Drawing Sheets

FIG.3

| INK | D1 | D2 | D3 | D4 | PREDICTED SUPERIMPOSED TRANSMISSION DENSITY (D) |
|---|---|---|---|---|---|
| DENSITY RATIO | 1 | 2 | 4 | 6 | |
| TRANSMISSION DENSITY (D) | 0.1 | 0.2 | 0.4 | 0.6 | |
| IMAGE DENSITY SIGNAL LEVEL | d1 | d2 | d3 | d4 | #1 |
| 0 | 0 | 0 | 0 | 0 | 0 |
| 1 | 1 | 0 | 0 | 0 | 0.1 |
| 2 | 0 | 1 | 0 | 0 | 0.2 |
| 3 | 1 | 1 | 0 | 0 | 0.3 |
| 4 | 0 | 0 | 1 | 0 | 0.4 |
| 5 | 1 | 0 | 1 | 0 | 0.5 |
| 6 | 0 | 1 | 1 | 0 | 0.6 |
| 7 | 1 | 1 | 1 | 0 | 0.7 |
| 8 | 0 | 1 | 0 | 1 | 0.8 |
| 9 | 1 | 1 | 0 | 1 | 0.9 |
| 10 | 0 | 0 | 1 | 1 | 1 |
| 11 | 1 | 0 | 1 | 1 | 1.1 |
| 12 | 0 | 1 | 1 | 1 | 1.2 |
| 13 | 1 | 1 | 1 | 1 | 1.3 |
| 14 | 1 | 1 | 1 | 1 | 1.3 |
| 15 | 1 | 1 | 1 | 1 | 1.3 |

LIGHT ↑ ↓ DARK

1: DISCHARGE
0: NO DISCHARGE

FIG.8A

| INK | D1 | D2 | D3 | D4 | PREDICTED SUPERIMPOSED TRANSMISSION DENSITY (D) |
|---|---|---|---|---|---|
| DENSITY RATIO | 1 | 2 | 4.2 | 7.2 | |
| TRANSMISSION DENSITY (D) | 0.1 | 0.2 | 0.42 | 0.72 | |
| IMAGE DENSITY SIGNAL LEVEL | d1 | d2 | d3 | d4 | #1 |
| 0 | 0 | 0 | 0 | 0 | 0 |
| 1 | 1 | 0 | 0 | 0 | 0.1 |
| 2 | 0 | 1 | 0 | 0 | 0.2 |
| 3 | 1 | 1 | 0 | 0 | 0.3 |
| 4 | 0 | 0 | 1 | 0 | 0.42 |
| 5 | 1 | 0 | 1 | 0 | 0.52 |
| 6 | 0 | 1 | 1 | 0 | 0.62 |
| 7 | 1 | 1 | 1 | 0 | 0.72 |
| 8 | 0 | 1 | 0 | 1 | 0.92 |
| 9 | 1 | 1 | 0 | 1 | 1.02 |
| 10 | 0 | 0 | 1 | 1 | 1.14 |
| 11 | 1 | 0 | 1 | 1 | 1.24 |
| 12 | 0 | 1 | 1 | 1 | 1.34 |
| 13 | 1 | 1 | 1 | 1 | 1.44 |
| 14 | 1 | 1 | 1 | 1 | 1.44 |
| 15 | 1 | 1 | 1 | 1 | 1.44 |

LIGHT ↑ ↓ DARK

INK TYPE DISTRIBUTION TABLE #1    1:DISCHARGE
0:NO DISCHARGE

FIG.8B

| INK | D1 | D2 | D3 | D4 | PREDICTED SUPERIMPOSED TRANSMISSION DENSITY (D) |
|---|---|---|---|---|---|
| DENSITY RATIO | 1 | 2 | 4.2 | 7.2 | |
| TRANSMISSION DENSITY (D) | 0.1 | 0.2 | 0.42 | 0.72 | |
| IMAGE DENSITY SIGNAL LEVEL | d1 | d2 | d3 | d4 | #2 |
| 0 | 0 | 0 | 0 | 0 | 0 |
| 1 | 1 | 0 | 0 | 0 | 0.1 |
| 2 | 0 | 1 | 0 | 0 | 0.2 |
| 3 | 1 | 1 | 0 | 0 | 0.3 |
| 4 | 0 | 0 | 1 | 0 | 0.42 |
| 5 | 1 | 0 | 1 | 0 | 0.52 |
| 6 | 0 | 1 | 1 | 0 | 0.62 |
| 7 | 1 | 1 | 1 | 0 | 0.72 |
| 8 | 1 | 0 | 0 | 1 | 0.82 |
| 9 | 0 | 1 | 0 | 1 | 0.92 |
| 10 | 1 | 1 | 0 | 1 | 1.02 |
| 11 | 0 | 0 | 1 | 1 | 1.14 |
| 12 | 1 | 0 | 1 | 1 | 1.24 |
| 13 | 0 | 1 | 1 | 1 | 1.34 |
| 14 | 1 | 1 | 1 | 1 | 1.44 |
| 15 | 1 | 1 | 1 | 1 | 1.44 |

LIGHT ↑  
DARK ↓

INK TYPE DISTRIBUTION TABLE #2    1: DISCHARGE  
0: NO DISCHARGE

FIG.8C

| INK | D1 | D2 | D3 | D4 | PREDICTED SUPERIMPOSED TRANSMISSION DENSITY (D) |
|---|---|---|---|---|---|
| DENSITY RATIO | 1 | 2 | 4.2 | 7.2 | |
| TRANSMISSION DENSITY (D) | 0.1 | 0.2 | 0.42 | 0.72 | |
| IMAGE DENSITY SIGNAL LEVEL | d1 | d2 | d3 | d4 | #3 |
| 0 | 0 | 0 | 0 | 0 | 0 |
| 1 | 1 | 0 | 0 | 0 | 0.1 |
| 2 | 0 | 1 | 0 | 0 | 0.2 |
| 3 | 1 | 1 | 0 | 0 | 0.3 |
| 4 | 0 | 0 | 1 | 0 | 0.42 |
| 5 | 1 | 0 | 1 | 0 | 0.52 |
| 6 | 0 | 1 | 1 | 0 | 0.62 |
| 7 | 1 | 1 | 1 | 0 | 0.72 |
| 8 | 0 | 0 | 0 | 1 | 0.72 |
| 9 | 1 | 0 | 0 | 1 | 0.82 |
| 10 | 0 | 1 | 0 | 1 | 0.92 |
| 11 | 1 | 1 | 0 | 1 | 1.02 |
| 12 | 0 | 0 | 1 | 1 | 1.14 |
| 13 | 1 | 0 | 1 | 1 | 1.24 |
| 14 | 0 | 1 | 1 | 1 | 1.34 |
| 15 | 1 | 1 | 1 | 1 | 1.44 |

LIGHT ↑ / DARK ↓

INK TYPE DISTRIBUTION TABLE #3    1: DISCHARGE
0: NO DISCHARGE

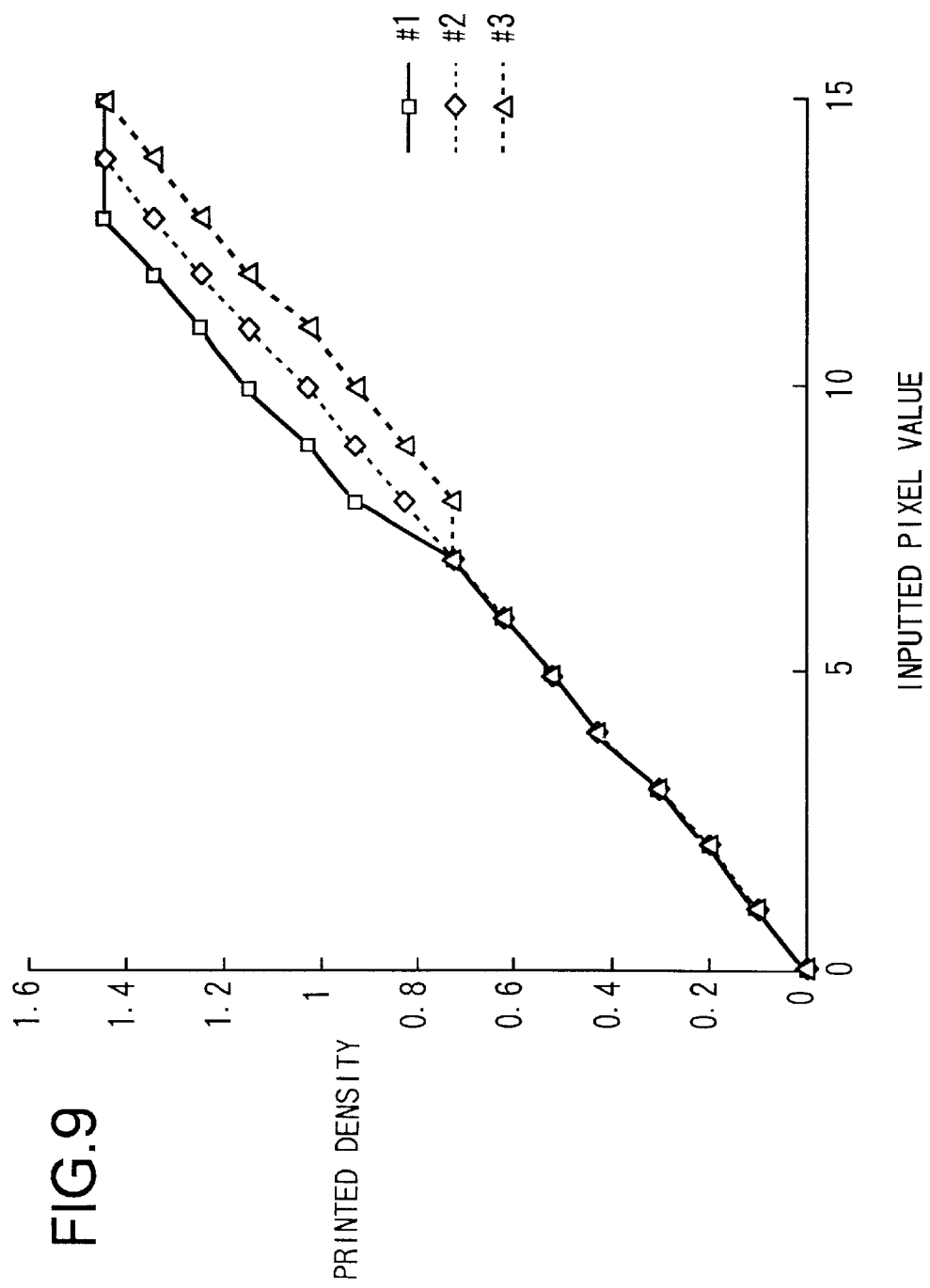

IMAGE PROCESSING METHOD AND APPARATUS, AND PRINTING METHOD AND APPARATUS

BACKGROUND OF THE INVENTION

The present invention relates to an image processing method and apparatus for generating image data for printing an image by using print materials (ink) having different densities. The present invention also relates to a printing method and apparatus for printing an image using print materials having different densities.

Printing apparatuses such as printers, copy machines, facsimiles or the like, print an image consisting of dot patterns on a print medium, e.g., paper or a plastic thin plate or the like, based on image data. Such printing apparatuses can be classified by the printing method, e.g., ink-jet type, wire dot type, thermal-transfer type, laser beam type and so on.

Among these types, the ink-jet type (ink-jet printing apparatus) is capable of discharging ink droplets from orifices of a printhead to a print medium.

Recently, a large number of printing apparatuses have been used along with dissemination of computers, and demands are increasing for printing apparatuses which attain high speed printing, high resolution, high quality images, and low noise. Since ink-jet printing apparatuses have a relatively small size, and can readily be applied to color printing, ink-jet printing apparatuses have rapidly become popular.

Many of the ink-jet printing apparatuses employ a printhead where a plurality of ink orifices (nozzles) are integrally arranged, or comprise a plurality of printheads for performing color printing. Furthermore, in order to satisfy the demands for high resolution and high quality image, these ink-jet printing apparatuses utilize half-tone processing method, e.g., dither method or error diffusion method or the like, for faithfully reproducing tones of image data.

An image having excellent tones can be printed by these tone reproduction methods if the resolution of the printing apparatus is sufficiently high (more than 1000 dots per inch). However, in a case where the printing apparatus has a low resolution (about 360 to 720 dots per inch), dots in a highlighted portion become prominently visible, and due to the non-continuity of pixels, a coarse image is produced. In order to increase the number of tones, a method is available for printing a dot having multiple tones. For instance, a voltage or a pulsewidth applied to a printhead is controlled to modulate a print dot diameter which is attached to a print medium, and an image having tones is reproduced by using the dots. However, such method is highly dependent upon its environment. Moreover, print dot diameters tend to fluctuate, and the size of the smallest printable dot is limited. Thus, it is difficult to stably reproduce an image having tones by modulating the diameter of a dot.

Moreover, a density modulation method is available, where dot density in a dot matrix (predetermined area) is changed while keeping the dot size constant. However, since this requires a large image area to increase the number of tones, resolution declines.

As a method of improving tone representation and obtaining an image having high density and high tonality by an ink-jet printing apparatus, a number of printing methods have been proposed and put into practice. One is called a multi-droplet method where a dot is formed by discharging a plurality of ink droplets on substantially the same position of a print medium. By changing the number of ink droplets discharged on a pixel, a pixel having tones is printed. Another method utilizes a plurality of inks having different densities to reproduce tones by combining at least two types of print dots having different densities of the same color group. Alternatively, a printing method combining the above-described two methods is also proposed and put into practice.

It is generally known that gradual evaporation of ink solvent in an ink-jet head unit causes an increase in ink density as the time lapses. As a result, particularly in the multi-droplet method or in the ink-jet printing method employing ink of different densities of the same color group for reproducing tones, the reproduced tones lose their balance due to the ink density fluctuation, causing deterioration of smooth tones in a reproduced image, and sometimes causing deterioration of reproduced image quality by forming a pseudo contour.

For a print medium (print sheet) on which printing is performed, there are more than ten types of printing media having different quality, durability and price depending on the usage purposes. Depending on the combination of a print sheet and ink used, or the combination of ink types superimposed, the ink absorption quantity, ink absorption speed, and the size of generated dot diameters vary. For this reason, sometimes a printed image has a skip of density (the density of the printed image does not correspond to density of the image data), reversed density or the like. Furthermore, in a case of printing with ink having different densities, since the above-described density fluctuation due to evaporation of ink solvent does not occur at an equal rate, a skip of density may result. Due to the foregoing causes, tonality of reproducing density is sometimes so deteriorated that it cannot be corrected by normal calibration.

SUMMARY OF THE INVENTION

The present invention is made in consideration of the above situation, and has as its object to provide an image processing method and apparatus which perform processing for printing an image by selecting the most optimum data from plural types of data, prepared for determining the print material to be used in accordance with density, and to provide a printing method and apparatus for printing the image.

Another object of the present invention is to provide an image processing method and apparatus which perform processing for printing an image by selecting, based on density of an actually printed image, the most optimum data from plural types of data, prepared for determining the print material to be used in accordance with density, and to provide a printing method and apparatus for printing the image.

Another object of the present invention is to provide an image processing method and apparatus which perform processing for printing an image by selecting a table from plural types of tables storing data for determining the print material to be used in accordance with density, wherein the selected table has the largest correlation between an actual density and the density obtained by printing using each of the tables.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 shows an example of an ink type distribution table according to the present embodiment;

FIGS. 8A to 8C show examples of a plurality of ink type distribution tables according to the present embodiment; and FIG. 9 is a graph for explaining a method of evaluating reproducibility of density tones according to the present embodiment.

DETAILED DESCRIPTION OF THE PREFERRED EMBODIMENTS

Figure 1:
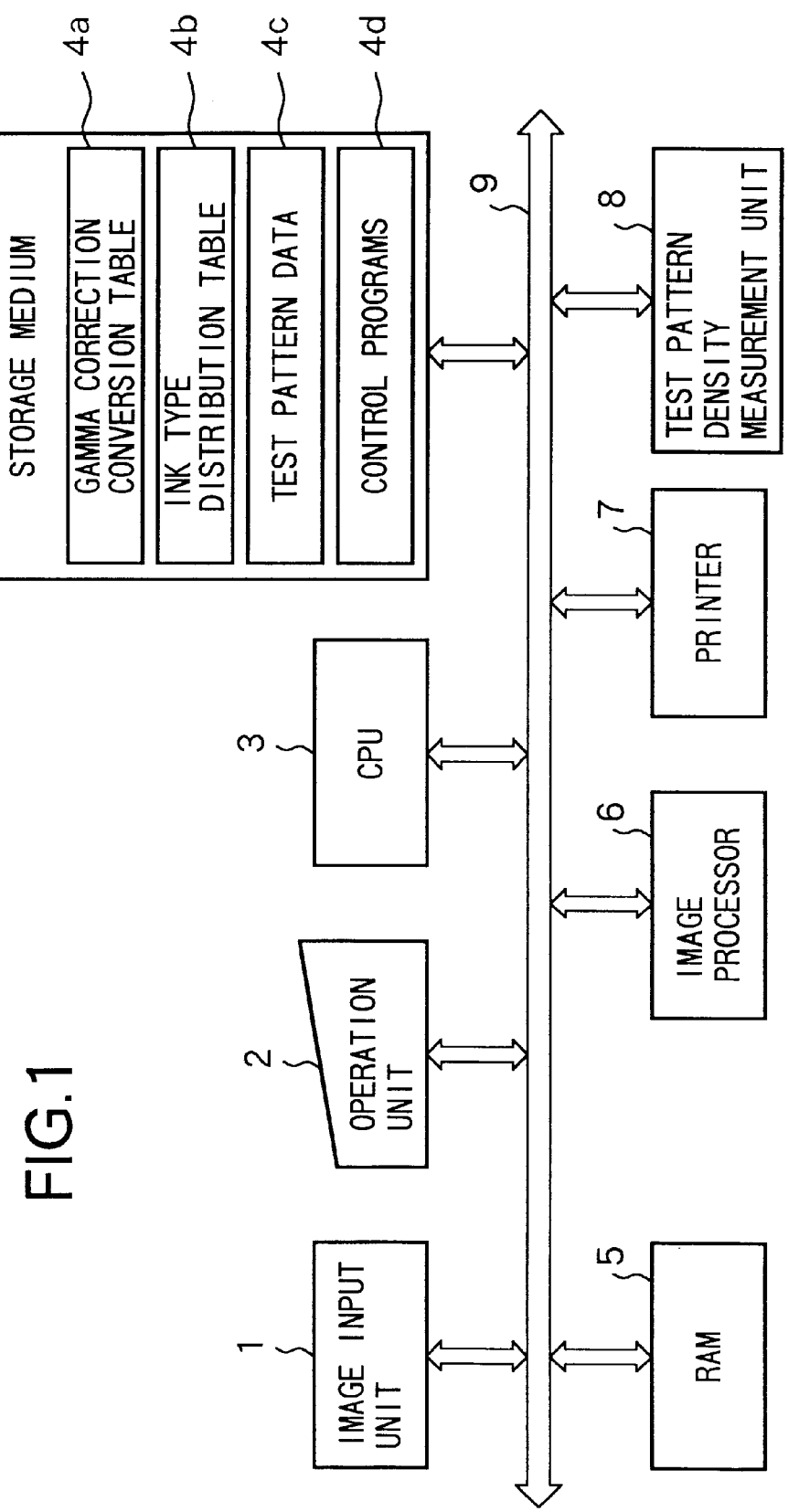
FIG. 1 is a block diagram showing a construction of an ink-jet printing apparatus according to an embodiment of the present invention.

Preferred embodiments of the present invention will be described in detail in accordance with the accompanying drawings. Note that for a purpose of simple description, the present embodiment provides an example of printing a monochrome image using a combination of ink and film having an additive property.

[Additive Property]

"A combination of ink and film having an additive property" means that a particular combination of ink and film achieves increased density of a pixel (the density of the pixel becomes the added result of the density of each ink of the combination), in a case where ink is superimposed a plural number of times on the same pixel position for printing an image by an ink-jet printing method on a transparent film which is used for transmission image printing (this density will be referred to as "transmission density"). An example of particular combination achieving an additive property is described hereinafter.

On a transparent film (CF-301), serving as a print medium (print sheet), dots are uniformly printed by an ink-jet printer using 2% solution of a dye-type ink, C.I. Direct Black 19. As a result, an image having a transmission density of "0.8D" is obtained. Similarly, dots are uniformly printed using 1% solution of the C.I. Direct Black 19. As a result, an image having a transmission density of "1.2D" is obtained. This experiment has confirmed that the combination of ink and film of this type achieves an additive property in the range of "0" to "2.5D."

In a case of using such combination of ink and film having an additive property, the number of tones reproducible can be significantly increased by superimposing plural types of ink having different densities.

[Ink Density]

Ink density of an ink-jet head unit is described hereinafter.

An example will be provided in a case of printing an image with four types of ink. Herein, the number of tones can be maximized, with varied ink combinations, by setting the density ratio of ink D1, D2, D3, and D4 to "1:2:4:6", in a case where a combination of ink and film achieves the additive property and where four times of ink superimposition on a pixel is possible without ink overflowing on a print medium.

FIG. 3 shows an example of an ink type distribution table storing data indicative of whether or not ink is to be discharged for a pixel data (density level). In FIG. 3, d1 to d4 denote data indicative of ink discharge/no ink discharge for ink D1 to D4. If the data is "1", ink is discharged, while if the data is "0", ink is not discharged. For example, in a case where a pixel data (density level) of image data is "10", ink D3 and D4 are superimposed on the pixel.

In a case where the density ratio of the four types of ink is 1:2:4:6 as set forth above, it is possible to express density of image data having density values in the range of "0" to "13" without the skip of density, by using the combination of ink discharge/no ink discharge of each ink based on the ink type distribution table.

Furthermore, in a case where ink density changes due to ink evaporation in an ink tank or nozzle, another ink type distribution table may be used. Correction of tonality in density which will be described later can be performed by selecting the most optimum table from a plurality of ink type distribution tables.

Hereinafter, the present embodiment will be described with reference to the drawings. Note that although the operation of the present embodiment is described as an operation of the ink-jet printing apparatus, the present invention is not limited to this. For instance, conversion processing from image data to print data may be performed by a computer such as a host computer or the like, or a printer driver or the like.

Furthermore, although the description of the present embodiment is provided on an ink-jet printing apparatus, the present invention is not limited to this, and is applicable to, e.g., a thermal-transfer color printing apparatus.

[First Embodiment]

FIG. 1 is a block diagram showing a construction of an ink-jet printing apparatus according to the first embodiment. In FIG. 1, reference numeral 1 denotes an image input unit such as a scanner or the like; 2, an operation unit comprising various keys for setting various parameters and giving commands to start printing; and 3, a CPU for controlling the entire printing apparatus according to various programs stored in a storage medium 4. The storage medium 4 includes programs for operating the printing apparatus according to control programs and error process programs. All the operation of the present embodiment is executed based on these programs. The storage medium 4 storing such programs may employ ROM, floppy disk (FD), CD-ROM, hard disc (HD), a memory card, magneto optical disk or the like.

The storage medium 4 comprises: a gamma correction conversion table 4a which is referred to in a gamma conversion process; an ink type distribution table 4b which is referred to in an ink type distribution process which will be described later; test pattern data 4c; and programs 4d including various programs.

Reference numeral 5 denotes a RAM which is used as a work area while executing various programs and image processes, or used as a temporary storage area at the time of error processing. Furthermore, it is possible to copy the contents of the various tables 4a to 4b and data 4c, stored in the storage medium 4, to the RAM 5. Then, the contents may be modified and image processes which will be described later may be performed by referring to the modified tables and data. Reference numeral 6 denotes an image processor which generates print data based on inputted image data, for printing an image having multiple tones by the ink-jet printing method. Reference numeral 7 denotes a printer (printer engine) which forms an image consisting of dots on a print medium such as a print sheet or the like, based on the print data generated by the image processor 6. Reference numeral 8 denotes a test pattern density measurement unit which will be further described later, for measuring density of a test pattern printed on a print sheet, and executes updating and changing the ink type distribution table 4b based on the measurement result. Reference numeral 9 denotes a bus connecting each of the above units and transmits address signals, data, control signals and the like.

Next, the operation of the image processor 6 according to the present embodiment will be briefly described with reference to FIG. 2.

Figure 2:
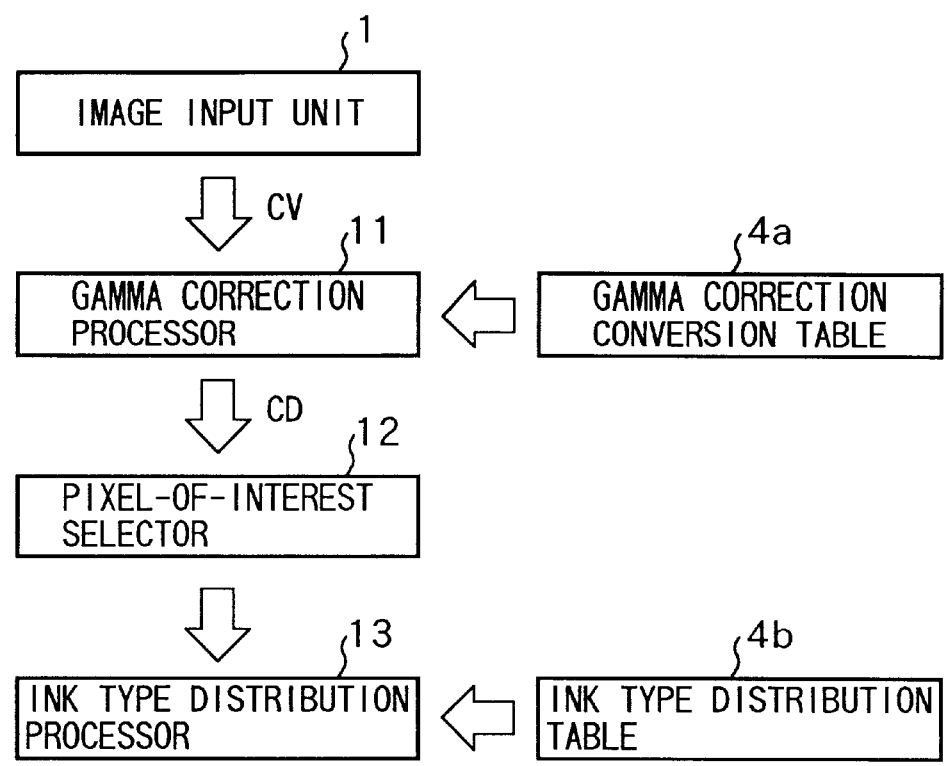
FIG. 2 is a diagram showing a flow of image processing performed by an image processor of the ink-jet printing apparatus according to the present embodiment.

FIG. 2 shows a process flow performed by the image processor 6 according to the present embodiment.

An image signal CV, inputted from the image input unit 1, is inputted to a gamma correction processor 11 where the image signal CV is converted to a density signal CD indicative of density by referring to the gamma correction conversion table 4a. The density signal CD of the image, on which gamma correction has been performed, is stored in a page memory area of the image processing work area of the RAM 5.

A pixel-of-interest selector 12 selects a pixel to be processed from the page memory area of the RAM 5, and obtains density data CD of the selected pixel. An ink type distribution processor 13 refers to the ink type distribution table 4b in accordance with a density value (value of CD) of the pixel of interest selected by the pixel-of-interest selector 12, to select an ink combination candidate for reproducing the density CD of the pixel of interest.

By performing the foregoing process, the process of determining binary data for printing the pixel of interest is completed.

In the printer 7, an image having multiple tones is formed by discharging ink from arrays of ink discharge orifices of the ink-jet head units, each having different densities, in accordance with the binary data d1, d2, d3, . . . . Note that in FIG. 2, reference numerals 17-1, 17-2, 17-3, and 17-4 denote delay circuits, each serving to control timing so that ink is discharged on the same pixel position from ink discharge orifices of each of the arrays.

Next, the printer 7 according to the present embodiment will be described with reference to FIG. 4.

Figure 4:
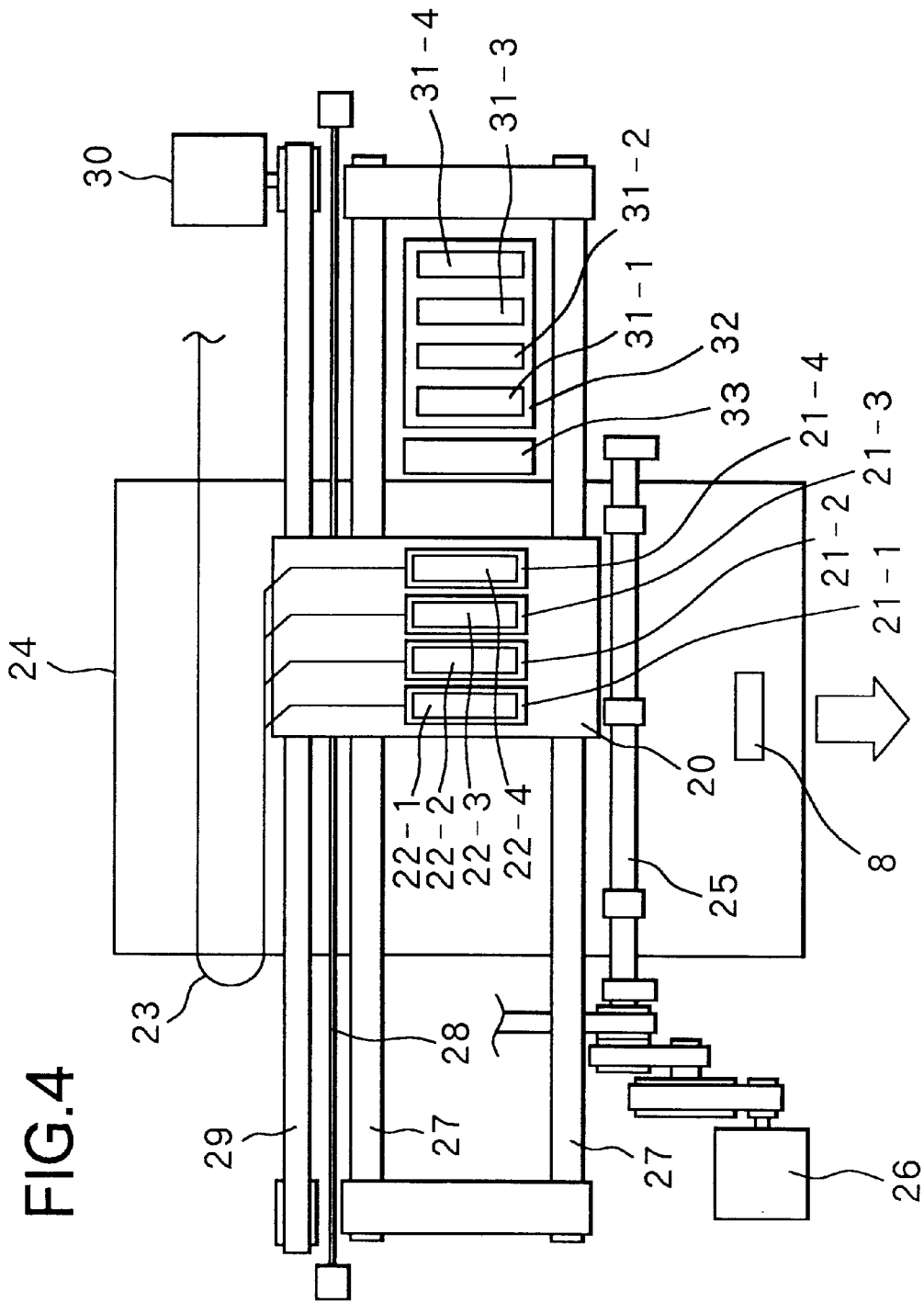
FIG. 4 is a structural view showing the main part of the printing mechanism of a printer of the ink-jet printing apparatus according to the present embodiment.

FIG. 4 shows a brief construction of the main part of the printer 7 according to the present embodiment.

A plurality of ink-jet head units 21-1 to 21-4 are mounted on a carriage 20. Each of the ink-jet head units 21-1 to 21-4 has an array of ink discharge orifices (nozzles). The ink-jet head units 21-1 to 21-4 are arranged at predetermined spaces. Therefore, the nozzle arrays of the ink-jet head units also have predetermined spaces. Ink provided to each nozzle array of the ink-jet head units 21-1 to 21-4 is supplied by ink cartridges 22-1 to 22-4 which respectively supply ink D1, D2, D3 and D4. Note that the density of the ink contained in each of these cartridges will be described later. Control signals and print signals directed to the ink-jet head unit 21 are transmitted from the image processor 6 through a flexible cable 23.

Reference numeral 24 denotes a print medium, e.g., print paper or a plastic thin sheet or the like, which is conveyed through a conveyance roller (not shown), clamped by a discharge roller 25, and conveyed to the direction of the arrow in FIG. 4 by the rotation of a conveyance motor 26. Reference numeral 27 denotes a guide shaft for guiding scan operation of the carriage 20. Reference numeral 28 denotes a linear encoder for detecting the position of the carriage 20. The carriage 20 is conveyed by the rotation of a carriage motor 30 through a driving belt 29, and reciprocally driven along the guide shaft 27.

Heating elements (electrothermal transducers) for generating heat energy to discharge ink are provided in the internal portion (liquid channel) of the ink discharge orifice of the ink-jet head unit 21. In conjunction with a timing signal from the linear encoder 28, the heating elements are driven based on the print data. Then, ink droplets are discharged on the print medium 24 in the sequence of ink D1, D2, D3 and D4, and an image is formed on the print medium 24.

A recovery unit 32, having caps 31-1 to 31-4, is provided at the home position of the carriage 20, which is positioned outside the printing area of the ink-jet head unit 21. When printing is not performed, the carriage 20 is moved to the home position so that the ink discharge surfaces of the ink-jet head units 21-1 to 21-4 are tightly covered by the corresponding caps 31-1 to 31-4 of the cap unit 31. This prevents ink coagulation due to drying of ink solvent at the discharge exits, or clogging of the discharge exits due to deposition of foreign matters such as dust.

The cap unit 31 is utilized for idling ink discharge to recover from poor discharge performance or clogging of ink discharge orifices having a low print frequency. The idling ink discharge is to discharge ink to the cap unit 31 which is positioned away from the ink discharge orifices. The cap unit 31 is also utilized to suck ink from the ink discharge orifices by activating a pump (not shown) while the cap unit 31 is capping the ink-discharge orifices, so as to recover from poor discharge condition of the discharge orifice. Reference numeral 33 denotes an ink tray. When printing is performed, each of the ink-jet head units 21-1 to 21-4 passes above the ink tray 33 to preliminarily discharge ink onto the ink tray 33. By providing a blade (not shown) or a wiping member near the cap unit 31, the surface of the ink discharge orifices of the ink-jet head unit can be cleaned.

Figure 6A:
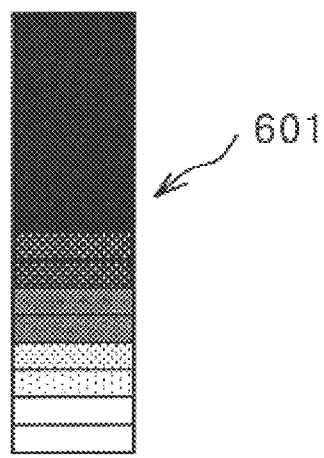
FIGS. 6A to 6C show examples of printed test patterns for automatic calibration according to the present embodiment.
Figure 6B:
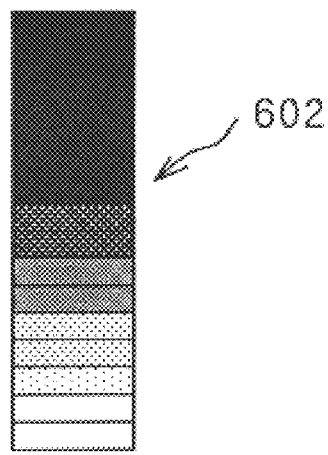
Figure 6C:
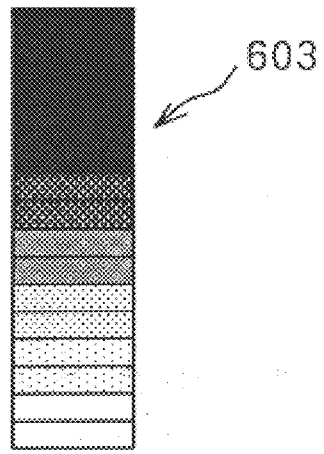

Near an exit in which the print medium 24 is discharged, the density measurement unit 8 which measures density of a printed test pattern on the print medium is mounted by supporting means (not shown). The density measurement unit 8 comprises a light source such as an LED or the like, an optical detector such as a phototransistor or the like, and a measurement circuit for inputting electric signals outputted by the optical detector and for detecting the density of a test pattern. More specifically, the optical detector detects the intensity of light which is emitted from the light source and transmitted through the print medium 24, in order to measure the density of the test pattern printed on the print medium 24. The density measurement unit 8 calculates transmission density of each tone pattern immediately after the test patterns shown in FIGS. 6A to 6C are printed. Then, in accordance with the calculated density, the density measurement unit 8 generates data to perform automatic calibration. Note that the present invention is not limited to measuring density of a transmission image, but is applicable to a case where, for instance, a test pattern on the print medium 24 is irradiated by light from the light source and the reflected light is detected to measure the density.

Figure 5:
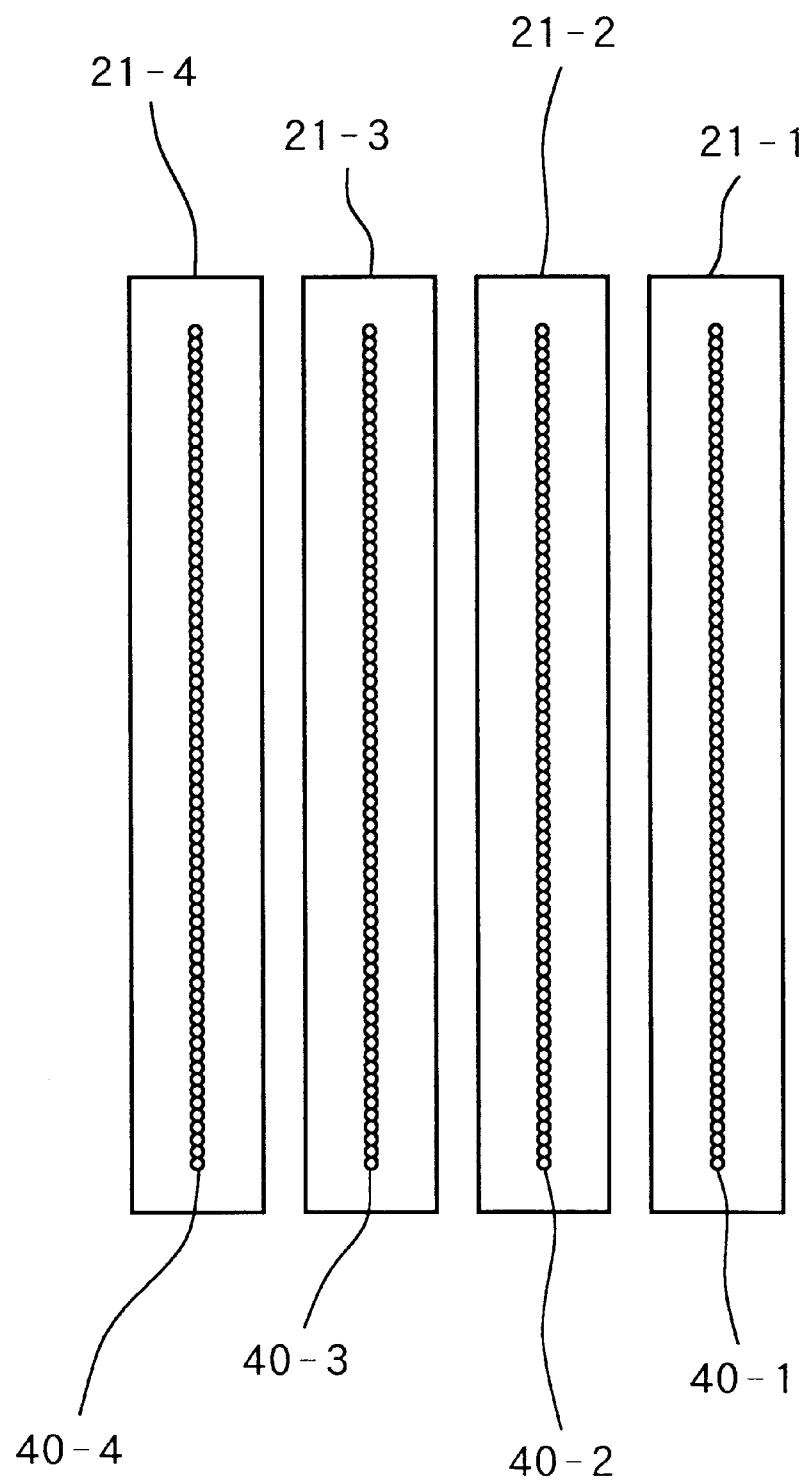
FIG. 5 is an explanatory view showing arrays of ink discharge orifices of the ink-jet head units according to the present embodiment.

FIG. 5 is a top view of the arrays of ink discharge orifices (nozzles) of the ink-jet head units 21-1 to 21-4, viewed from the print medium 24. The construction of the arrays of ink-discharge orifices in the printer 7 and an example of image formation by the printer 7 according to the present embodiment will be described with reference to FIG. 5.

In FIG. 5, reference numerals 40-1 to 40-4 denote discharge orifice arrays respectively discharging ink D1 to D4. The discharge orifice array of each ink-jet head unit comprises 256 discharge orifices arranged with the pitch of 600 dots per inch (600 dpi) in the vertical direction (sub scanning direction). During a single scan of the carriage 20 in the main scanning direction, an image having the width of 256 dots in the sub scanning direction, where four types of ink D1 to D4 are superimposed, can be formed. By virtue of this, an image having a high tonality can be formed with reduced printing time.

[Automatic Density Calibration]

Next described is the method of automatic calibration, performed when printing is performed by an ink-jet printing apparatus according to the present embodiment. The automatic calibration is performed to always obtain an image having excellent tonality on a print medium.

Figure 7:
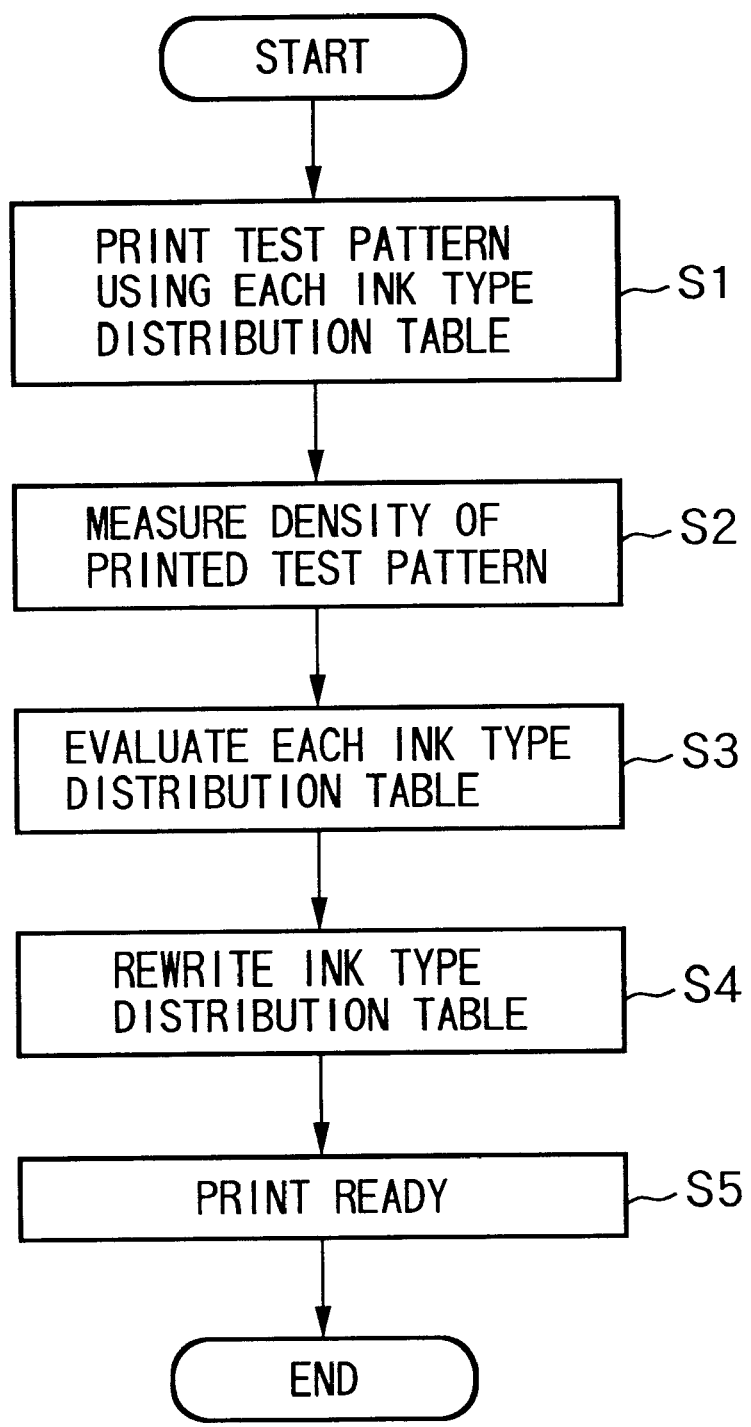
FIG. 7 is a flowchart showing steps of automatic calibration according to the present embodiment.

FIG. 7 is a flowchart showing the steps of automatic calibration according to the present embodiment.

Test patterns having tonality in density (hereinafter referred to as a tone density pattern) are printed (step S1) on a sheet of print medium as shown in FIGS. 6A to 6C, using a plurality of ink type distribution tables (herein, tables #1 to #3) shown in FIGS. 8A to 8C. In step S2, the density measurement unit 8 of the printer 7 measures the density of the test patterns printed based on each of the ink type distribution tables. In step S3, the density measured with respect to each ink type distribution table is linearly approximated by employing the least squares method to the density levels of an image signal. In step S4, an ink type distribution table having the largest correlation coefficient for the least squares method is obtained. Herein, the ink type distribution table having the largest correlation coefficient for the least squares method is the data table that achieves the highest tonality in density. Thus, the obtained table is written in the ink type distribution table 4b of the storage medium 4, and the printer 7 is set ready on standby. In the subsequent printing, this ink type distribution table 4b is used to determine an ink-jet head unit to be used in accordance with a density value of a pixel in an image, and printing is executed accordingly.

Next, the calibration operation performed in step S4 will be described in detail with reference to FIG. 2.

As mentioned above, it is assumed that the storage medium 4 stores in advance, as the test pattern data, the plurality of ink type distribution tables #1, #2 and #3 and image data corresponding to the tone density patterns comprising about 16 tones in density.

As the plurality of ink type distribution tables of the present embodiment, three ink type combinations (three tables) are stored in the storage medium 4 in correspondence with the range of the density levels 8 to 14. Plural types of combinations are prepared for the high density because ink having a high density (dark), used for reproducing a high density image, is largely influenced by density fluctuation.

Moreover, influences of secular changes are more likely to appear in the higher density image area. Therefore, it is preferable to prepare a table of a transmission density lower than a predicted transmission density of a reference table, or is preferable to have a larger number of tables for a low predicted transmission density than that of a high predicted transmission density.

The automatic calibration operation according to the present embodiment starts when the power of the printing apparatus is turned on, or before an operator uses the printer 7, or when ink or a print medium or an ink-jet head is exchanged. The automatic calibration is started when instructed by a host computer, or by pressing an automatic calibration start button (not shown) on the operation unit 2 as necessary at an arbitrary timing or periodically.

First, the ink type distribution table #1 is written in the ink type distribution table 4b of the storage medium 4. Then, image data of the aforementioned test patterns is inputted to the image processor 6 as an image signal CV. The image data is converted to a density signal CD by using the gamma correction conversion table 4a, and the density signal is stored in a page memory area of the image processing work area of the RAM 5.

A pixel is selected from the test pattern which has been converted to the density signals, and density data CD of the selected pixel is obtained. Based on the obtained density data CD, an ink combination for printing the pixel is determined by referring to the ink type distribution table #1. Then, binary data d1, d2, d3, . . . , indicative of ink discharge/no ink discharge, for printing the pixel is generated for each ink-jet head unit. In accordance with the generated binary data, each of the ink-jet head units discharges ink, thereby printing the pixel. The above process is subsequently executed for other pixels of the test pattern. As a result, the test pattern is printed based on the binary data generated by using the ink type distribution table #1.

When the printing of the test pattern is completed in the above-described manner, the ink type distribution table #2 is written in the ink type distribution table 4b. Based on the same test pattern data, an ink combination for printing the pixel is determined by referring to the ink type distribution table #2. Then, printing of the test pattern is performed on the print medium in the above-described manner.

In the similar manner, printing is performed based on the binary data which determines the ink type distribution table #3. As a result, test patterns as shown in FIGS. 6A to 6C are printed. Referring to FIGS. 6A to 6C, reference numeral 601 (FIG. 6A) denotes a pattern printed by using the ink type distribution table #1; 602 (FIG. 6B), a pattern printed by using the ink type distribution table #2; and 603 (FIG. 6C), a pattern printed by using the ink type distribution table #3.

As shown in FIGS. 6A to 6C, since the printed tone density pattern is printed in an array, a single optical sensor of the density measurement unit 8 is sufficient. This provides an advantage of accurate density measurement with a simple construction. Moreover, since the test patterns are printed successively on a single sheet of print medium, the number of print media necessary for calibration can be kept minimal. Further, accurate density measurement and calibration can be performed without being influenced by variations of print media.

While the print medium is being discharged from the printer 7, the density measurement unit 8 measures density of the test patterns. More specifically, the print medium, on which the tone density patterns are printed, is conveyed by the discharge roller 25 in the direction of the tone pattern array. As each density area of the tone density patterns passes the density measurement unit 8 one after another, the density of the patterns is measured automatically.

FIG. 9 is a graph showing plotted density data of each tone pattern, measured with respect to image data of each density. By virtue of varieties in the ink type distribution tables, different tonality in density can be obtained.

FIG. 9 shows plotted data of density actually measured in a case where the density of ink D3 and D4 increases by 5% and 20% to "0.42D" and "0.72D" respectively. The plotting is provided only for the purpose of explanation, and does not need to be performed in actual automatic calibration.

Herein, to obtain the most optimum table from the plurality of ink type distribution tables (#1 to #3), after the test pattern is printed and density is measured, linear approximation is performed by the least squares method in the automatic calibration process according to the present embodiment, with respect to 14 tones (density levels 0 to 13), excluding the part where density is saturated, based on a difference between the density data measured from the printed test patterns and the density data of the original image. Then, a correlation coefficient between these densities is obtained. The ink type distribution table having the largest correlation coefficient has the best reproducibility of density tones. Thus, this table is written in the ink type distribution table 4b of the storage medium 4. Until next calibration is performed, this table is used as the ink type distribution table for printing operation. Based on the determined ink type distribution table 4b, the ink-jet head unit to be used in accordance with density is determined, and printing is performed based on the determined data (binary data).

In the example shown in FIG. 9, the correlation coefficients for the ink distribution tables, which are obtained by linearly approximating the measured density of the tone density patterns printed by using the ink type distribution tables #1, #2, and #3, are respectively "0.997," "0.999," and "0.994". Therefore, the ink type distribution table #2, having the largest correlation coefficient, achieves the highest tonality in density. The ink type distribution table #2 is then written in the ink type distribution table 4b of the storage medium 4 and will be used in the subsequent printing process (shown in the flow of FIG. 2).

Note that although the present embodiment evaluates the ink type distribution tables by utilizing a correlation coefficient of the least squares method, the present invention is not limited to this. Other evaluation methods may be used to select the most optimum ink type distribution table.

Furthermore, although the present embodiment has provided the description for the case of using four types of ink, the present invention is not limited to this. Further, the number of the ink type distribution tables prepared in advance is not limited to three tables. By having a larger number of ink type distribution tables, even in a case where ink density largely fluctuates, it is possible to select an ink type distribution table having the most optimum tone reproducibility.

Furthermore, test patterns are not limited to those shown in FIGS. 6A to 6C, but test patterns having a most appropriate shape and density pattern may be used in accordance with the measurement method, for the most optimum calibration operation.

Moreover, although the present embodiment performs test printing by using the ink type distribution tables prepared in advance, an ink type distribution table may be newly generated based on the measured density of a test pattern, or an existing ink type distribution table may be modified in accordance with the level of density fluctuation. Then, test printing may be performed by using a plurality of distribution tables including the above ink type distribution table.

Furthermore, although the present embodiment automatically performs density measurement of test patterns, density measurement may be performed by another system, and the measured density data may be transferred or may be inputted by an operator from a control panel or the like, to similarly select a most optimum ink type distribution table for printing.

Each of the embodiments described above comprises means (e.g., an electrothermal transducer, laser beam generator, and the like) for generating heat energy as energy utilized upon execution of ink discharge, and adopts the method which causes a change in state of ink by the heat energy, among the ink-jet printing method. According to this printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type and continuous type system. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As a pulse-form driving signal, signals disclosed in U.S. Pat. Nos. 4,463,359 and 4,345,262 are suitable. Note that excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, an arrangement using U.S. Pat. Nos. 4,558,333 and 4,459,600, which disclose the arrangement having a heat-acting portion arranged in a flexed region, is also included in the present invention. In addition, the present invention can be effectively applied to an arrangement based on Japanese Patent Laid-Open No. 59-123670 which discloses an arrangement using a slot common to a plurality of electrothermal transducers as a discharge portion of the electrothermal transducers, or Japanese Patent Laid-Open No. 59-138461 which discloses an arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive ink from the apparatus main unit upon being mounted on the apparatus main unit, or a cartridge type printhead in which an ink tank is integrally arranged on the printhead itself, is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (operating system) or the like working on the computer performs a part of or the entire process in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, the CPU or the like contained in the function expansion card or unit performs a part of or the entire process in accordance with designations of the program codes and realizes functions of the above embodiments.

As has been set forth above, the present invention realizes printing with high quality and high tonality even if ink density fluctuates.

Moreover, besides the fluctuation of ink density, tonality in density may deteriorate due to different densities depending on the type of print medium used. Even for this case, by performing the automatic calibration described in the present embodiment, an image having the most optimum tonality in density throughout the image can be reproduced and outputted. Moreover, by determining a combination of ink to be superimposed or a combination of ink and a print medium, the most optimum ink type distribution table can be selected even if the tonality in density to be reproduced has a large variation.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
    storage means for storing plural types of superimposition recording data, indicative of superimposition information of recording materials having different densities in correspondence with pixel values;
    recording means for recording a predetermined image on a recording medium by using the plural types of superimposition recording data respectively;
    measurement means for measuring density of the predetermined image on the recording medium recorded by said recording means;
    selection means for selecting most optimum superimposition recording data from the plural types of superimposition recording data based on the density measured by said measurement means and a pixel value of the predetermined image; and
    generation means for generating recording data for recording an image by using the recording materials having different densities in accordance with image data, based on the superimposition recording data selected by said selection means.

2. The image processing apparatus according to claim 1, wherein the plural types of recording materials are ink having different densities.

3. The image processing apparatus according to claim 2, wherein the superimposition recording data is data for determining a driving signal for driving each of ink jet heads respectively having different densities of ink, in correspondence with pixel values.

4. The image processing apparatus according to claim 1, wherein said predetermined image is a test image having multiple tones.

5. The image processing apparatus according to claim 1, wherein said selection means obtains a correlation coefficient between the density measured by said measurement means and the pixel values of said predetermined image, and selects superimposition recording data having a largest correlation based on the correlation coefficient.

6. An image processing method comprising the steps of:
    recording a predetermined image on a recording medium by using plural types of superimposition recording data respectively;
    measuring density of the predetermined image on the recording medium recorded in said recording step;
    selecting most optimum superimposition recording data from the plural types of superimposition recording data based on the density measured in said measuring step and a pixel value of the predetermined image; and generating recording data for recording an image by using recording materials having different densities in accordance with image data, based on the superimposition recording data selected in said selecting step.

7. The image processing method according to claim 6, wherein the plural types of recording materials are ink having different densities.

8. The image processing method according to claim 7, wherein the superimposition recording data is data for determining a driving signal for driving each of ink jet heads respectively having different densities of ink, in correspondence with pixel values of image data.

9. The image processing method according to claim 6, wherein said predetermined image is a test image having multiple tones.

10. The image processing method according to claim 6, wherein in said selecting step, a correlation coefficient between the density measured in said measuring step and pixel values of said predetermined image is obtained, and superimposition recording data having a largest correlation based on the correlation coefficient is selected.

11. A recording apparatus for recording an image on a recording medium using a plurality of recording materials, comprising:

storage means for storing plural types of superimposition recording data, indicative of superimposition information of recording materials having different densities in correspondence with pixel values;

recording means for recording a predetermined image on a recording medium by using the plural types of superimposition recording data respectively;

measurement means for measuring density of the predetermined image on the recording medium recorded by said recording means;

selection means for selecting most optimum superimposition recording data from the plural types of superimposition recording data based on the density measured by said measurement means and a pixel value of the predetermined image;

generation means for generating recording data for recording an image by using the recording materials having different densities in accordance with inputted image data, based on the superimposition recording data selected by said selection means; and control means for controlling to record the inputted image data by driving said recording means, based on the recording data generated by said generation means.

12. The recording apparatus according to claim 11, wherein the plural types of recording materials are ink having different densities.

13. The recording apparatus according to claim 12, wherein the superimposition recording data is data for determining a driving signal for driving each of ink jet heads respectively having different densities of ink, in correspondence with pixel values of image data.

14. The recording apparatus according to claim 11, wherein said predetermined image is a test image having multiple tones.

15. The recording apparatus according to claim 11, wherein said selection means obtains a correlation coefficient between the density measured by said measurement means and pixel values of said predetermined image, and selects superimposition recording data having a largest correlation based on the correlation coefficient.

16. A recording method of recording an image on a recording medium using a plurality of recording materials, comprising the steps of:

recording a predetermined image on a recording medium by respectively using plural types of superimposition recording data which determine superimposition information of recording materials having different densities in correspondence with pixel values;

measuring density of the predetermined image on the recording medium recorded in said recording step;

selecting most optimum superimposition recording data from the plural types of superimposition recording data based on the density measured in said measuring step and a pixel value of the predetermined image;

generating recording data for recording an image by using the recording materials having different densities in accordance with inputted image data, based on the superimposition recording data selected in said selecting step; and controlling to record the inputted image data based on the recording data generated in said generating step.

17. The recording method according to claim 16, wherein the plural types of recording materials are ink having different densities.

18. The recording method according to claim 17, wherein the superimposition recording data is data for determining a driving signal for driving each of ink jet heads respectively having different densities of ink, in correspondence with pixel values.

19. The recording method according to claim 16, wherein said predetermined image is a test image having multiple tones.

20. The recording method according to claim 16, wherein in said selecting step, a correlation coefficient between the density measured in said measuring step and density of said predetermined image is obtained, and superimposition recording data having a largest correlation based on the correlation coefficient is selected.

21. A storage medium storing a program for processing image data to be outputted to a recording apparatus, comprising:

a recording step module for recording a predetermined image on a recording medium by using plural types of superimposition recording data respectively;

a measurement step module for measuring density of the predetermined image on the recording medium recorded by said recording step module;

a selection step module for selecting most optimum superimposition recording data from the plural types of superimposition recording data based on the density measured in said measuring step module and a pixel value of the predetermined image; and a generation step module for generating recording data for recording an image by using recording materials having different densities in accordance with image data, based on the recording data selected by said selection step module.

22. A storage medium storing a program for executing a recording process of recording an image on a recording medium by using a plurality of recording materials, comprising:

a recording step module for recording a predetermined image on a recording medium by respectively using plural types of superimposition recording data which determine superimposition information of recording materials having different densities in correspondence with pixel values;

a measurement step module for measuring density of the predetermined image on the recording medium recorded by said recording step module;

a selection step module for selecting most optimum superimposition recording data from the plural types of superimposition recording data based on the density measured by said measurement step module and a pixel value of the predetermined image;

a generation step module for generating recording data for recording an image by using the recording materials having different densities in accordance with inputted image data, based on the superimposition recording data selected by said selection step module; and a control step module for controlling to record the inputted image data based on the recording data generated by said generation step module.

* * * * *

UNITED STATES PATENT AND TRADEMARK OFFICE
CERTIFICATE OF CORRECTION

PATENT NO. : 6,322,186 B1
DATED : November 27, 2001
INVENTOR(S) : Shimizu et al.

It is certified that error appears in the above-identified patent and that said Letters Patent is hereby corrected as shown below:

Column 2,
Line 10, "the" (first occurrence) should be deleted.
Line 26, "to" should read -- to the --.

Column 4,
Line 1, "ink" should read -- inks --.
Line 10, "ink" (first occurrence) should read -- inks --.
Line 13, "ink" should read -- inks --.

Column 5,
Line 58, "ink" should read -- inks --.

Column 6,
Line 14, "ink" should read -- inks --.
Line 23, "31-4of" should read -- 31-4 of --.

Column 7,
Line 4, "ink" should read -- inks --.
Line 7, "(sub scanning" should read -- (sub-scanning --.
Line 10, "sub scanning" should read -- sub-scanning --.

Column 8,
Line 64, "ink" should read -- inks --.

Column 10,
Line 4, "method." should read -- methods. --.
Line 12, "system." should read -- systems. --.

Column 12,
Line 8, "ink" (first occurrence) should read -- inks --.

UNITED STATES PATENT AND TRADEMARK OFFICE
CERTIFICATE OF CORRECTION

PATENT NO. : 6,322,186 B1
DATED : November 27, 2001
INVENTOR(S) : Shimizu et al.

It is certified that error appears in the above-identified patent and that said Letters Patent is hereby corrected as shown below:

Column 14,
Line 56, "in" should read -- by --.

Signed and Sealed this

Twenty-first Day of January, 2003

JAMES E. ROGAN
*Director of the United States Patent and Trademark Office*